United States Patent
Kobayashi et al.

(10) Patent No.: US 10,023,318 B2
(45) Date of Patent: Jul. 17, 2018

(54) MOTORIZED AIRCRAFT AND METHOD FOR DETERMINING OUTPUT AND NUMBER OF ELECTRIC MOTORS IN MOTORIZED AIRCRAFT

(71) Applicant: Japan Aerospace Exploration Agency, Tokyo (JP)

(72) Inventors: Hiroshi Kobayashi, Tokyo (JP); Akira Nishizawa, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 0 days.

(21) Appl. No.: 15/314,848

(22) PCT Filed: Jun. 30, 2015

(86) PCT No.: PCT/JP2015/068794
§ 371 (c)(1),
(2) Date: Nov. 29, 2016

(87) PCT Pub. No.: WO2016/009824
PCT Pub. Date: Jan. 21, 2016

(65) Prior Publication Data
US 2017/0190435 A1    Jul. 6, 2017

(30) Foreign Application Priority Data
Jul. 17, 2014    (JP) ................................ 2014-146521

(51) Int. Cl.
B64D 27/00    (2006.01)
B64D 27/24    (2006.01)
(Continued)

(52) U.S. Cl.
CPC ............. *B64D 27/24* (2013.01); *B64D 35/08* (2013.01); *H02P 5/46* (2013.01); *H02P 29/10* (2016.02); *Y02T 50/44* (2013.01); *Y02T 50/62* (2013.01)

(58) Field of Classification Search
CPC .................................................. B64D 2221/00
See application file for complete search history.

(56) References Cited

U.S. PATENT DOCUMENTS 2,310,220 A * 2/1943 De Michelis .......... B64D 35/06
                                                        123/54.2
4,554,989 A    11/1985 Gruich et al.
(Continued)

FOREIGN PATENT DOCUMENTS

| DE | 102011103572 A1 | 12/2011 |
| JP | 2013-001185 A | 1/2013 |
| WO | WO-2013/029085 A1 | 3/2013 |

OTHER PUBLICATIONS

International Search Report in International Application No. PCT/JP2015/068794, filed Jun. 30, 2015.
(Continued)

*Primary Examiner* — Bickey Dhakal
(74) *Attorney, Agent, or Firm* — Saliwanchik, Lloyd & Eisenschenk

(57) ABSTRACT

A motorized aircraft is controlled by a drive control means that rotationally drives a propulsion system propeller. The propulsion system propeller is driven by a plurality of electric motors. A comparison detection unit compares estimated propeller torque and estimated motor torque with each other and detects an abnormal state of an electric motor on the basis of the fact that a difference between the propeller torque and a multiple of the motor torque is above a predetermined value.

10 Claims, 12 Drawing Sheets

(51) Int. Cl.
*B64D 35/08* (2006.01)
*H02P 29/10* (2016.01)
*H02P 5/46* (2006.01)

(56) References Cited

U.S. PATENT DOCUMENTS

| | | | |
|---|---|---|---|
| 5,106,035 A | 4/1992 | Langford, III | |
| 6,931,247 B2 | 8/2005 | Cox et al. | |
| 7,694,914 B1 | 4/2010 | Smith | |
| 9,209,721 B2 * | 12/2015 | Solodovnik | H02P 5/68 |
| 2008/0006739 A1 | 1/2008 | Mochida et al. | |
| 2014/0248168 A1 * | 9/2014 | Chantriaux | B64C 27/14 |
| | | | 417/410.1 |
| 2014/0257599 A1 * | 9/2014 | Kobayashi | B64D 31/06 |
| | | | 701/3 |

OTHER PUBLICATIONS

Aeronautical Technology Directorate, JAXA, "Flight Path No. 4", issued Mar. 2014.

\* cited by examiner

MOTORIZED AIRCRAFT AND METHOD FOR DETERMINING OUTPUT AND NUMBER OF ELECTRIC MOTORS IN MOTORIZED AIRCRAFT

CROSS-REFERENCE TO RELATED APPLICATION

This application is the U.S. national stage application of International Patent Application No. PCT/JP2015/068794, filed Jun. 30, 2015, which claims priority to Japanese Application No. 2014-146521, filed Jul. 17, 2014, the disclosures of each of which are incorporated herein by reference in their entirety.

TECHNICAL FIELD

The present invention relates to a motorized aircraft in which a propulsion system is driven by electric motors and to a method for determining output and the number of electric motors in the motorized aircraft.

BACKGROUND ART

In recent years, the sales of small aircrafts with capacities from several to dozen passengers have greatly increased due to their high convenience and enhancement of fuel efficiency. Demands on them will increase in future as a transport means that helps airliners' air transport. They are expected to create a new market that activates the aircraft industry. However, the number of accidents involving small aircrafts with capacities of several passengers is much more than that of large airliners. It is a factor hindering the spread of small aircrafts.

Most of such accidents are caused by maneuvering errors due to an increase in workload on less experienced pilots. Therefore, it is the urgent need for development of the aircraft industry to reduce load on pilots not only in normal flight conditions but also in bad weather conditions and in the case of trouble where the workload is likely to increase.

In such circumstances, a motorized aircraft in which a propulsion unit such as a propeller is driven by electric motors, which is coming closer to reality in recent years, has high fuel efficiency. In addition, various maneuvering automation technologies using electric motors with extremely higher controllability and responsiveness in comparison with an internal-combustion engine has been proposed (see Non-Patent Literature 1).

Providing high maintainability, the various maneuvering automation technologies using electric motors are aimed at enabling many people to easily handle aircrafts like automobiles without needing special trainings. Such maneuvering automation technologies using electric motors can reduce the maneuvering errors, load, and the like of pilots as described above. Further, the maneuvering automation technologies using electric motors can lower the accident rate. Therefore, the maneuvering automation technologies using electric motors can promote the spread of small aircrafts.

It should be noted that, for applying such technologies, it is always necessary to prevent the maneuvering automation technologies as described above from being broken without requiting special maneuvering techniques and correction operations of pilots. That is, it is necessary to continue stable flight as in normal flight even during emergency.

Here, examples in which workload greatly increases in an unexpected situation can include great reduction and lost of thrust, which are caused by propulsion system trouble in flight. In such a case, a pilot is required to conduct many operations such as thrust recovery operations and search for an emergency landing point at the same time. It increases workload on the pilot and induces maneuvering errors.

It is conceivable that, for solving such a problem, the provision of a plurality of propulsion systems as described in, for example, Patent Literature 1 can prevent a complete loss of thrust.

CITATION LIST

Patent Literature

Patent Literature 1: U.S. Pat. No. 6,931,247 B2

Non-Patent Literature

Non-Patent Literature 1: in particular, pages 8 and 9 of "FLIGHT PATH No. 4" (issued on March, 2014 by Aeronautical Technology Directorate, JAXA)

DISCLOSURE OF INVENTION

Technical Problem

However, in the technology described in Patent Literature 1, a reduction or loss per se of thrust of a part of a propulsion unit in a multi-engine aircraft makes thrust distribution ununiform. It greatly changes behaviors of an aircraft body (generation of a yaw moment, etc.). Therefore, the pilot has to urgently conduct much more recovery operations in addition to the above-mentioned operations. It further increases the workload. As a countermeasure against such ununiform thrust distribution, a method of reducing thrust on one side of the aircraft body in the case where thrust decreases on the other side, so as to keep yaw stability of the aircraft body. However, thrust of the entire aircraft body also decreases. Thus, pilot's correction operations are still necessary.

As mentioned above, each of the electric motors individually has high reliability and maintainability. Therefore, the risk that thrust may be lost is lower in the electric motors in comparison with driving by the use of the internal-combustion engine. However, it is difficult for the electric motor to detect an abnormality or a symptom thereof (hereinafter, referred to as "abnormal state") such as demagnetization of a permanent magnet and burning of a coil that may occur at a high temperature, which can be particularly problems during application of the aircraft. Therefore, the electric motor is insufficient for satisfying a demand on the reliability required of the aircraft.

The present invention has been made in order to solve those problems. It is an object of the present invention to provide a motorized aircraft in which a propulsion system propeller or fan is rotationally driven by a drive system including electric motors, the motorized aircraft being capable of ensuring safety required of the aircraft.

It is another object of the present invention to provide a motorized aircraft capable of ensuring safety while suppressing an increase in total weight of a drive system and a method for determining output and the number of electric motors in the motorized aircraft.

Solution to Problem

A motorized aircraft according to the embodiment of the present invention is a motorized aircraft including a plurality of electric motors that rotationally drive a propulsion system propeller or fan.

Further, total output of the plurality of electric motors and required output satisfy the following relationship:

$$P\max(n-1)/n > P\text{req}$$

where Pmax is the total output (kW) of the electric motors, n is the number of electric motors, and Preq is the required output (kW).

A motorized aircraft according to an embodiment of the present invention includes: at least a propulsion system propeller or fan; and a plurality of electric motors that rotationally drive the propulsion system propeller or fan.

A method according to an embodiment of the present invention is a method for determining output and the number of electric motors in a motorized aircraft including a plurality of electric motors that rotationally drive a propulsion system propeller or fan, the method including determining the output and number of electric motors such that total output of the plurality of electric motors and required output satisfy the following relationship:

$$P\max(n-1)/n > P\text{req}$$

where Pmax is the total output (kW) of the electric motors, n is the number of electric motors, and Preq is the required output (kW).

Advantageous Effects of Invention

In accordance with the present invention, it is possible to ensure the safety required of the aircraft.

Further, it is possible to ensure the safety required of the aircraft while suppressing the increase in total weight of the drive system.

MODE(S) FOR CARRYING OUT THE INVENTION

Figure 1:
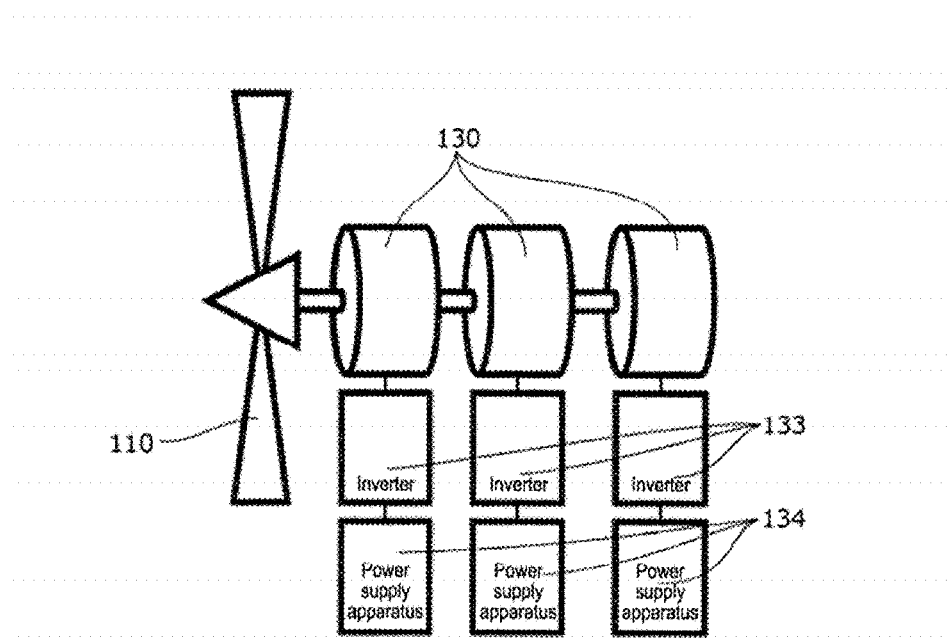
FIG. 1 A schematic configuration explanatory diagram of an example of a basic form of a propulsion system of a motorized aircraft according to the present invention.

A motorized aircraft according to an embodiment of the present invention is a motorized aircraft, including a plurality of electric motors that rotationally drive a propulsion system propeller or fan, in which total output of the plurality of electric motors and required output satisfy the following relationship: Pmax(n−1)/n>Preq, where Pmax is the total output (kW) of the electric motors, n is the number of electric motors, and Preq is the required output (kW).

In accordance with the motorized aircraft according to the embodiment of the present invention, the propulsion system propeller or fan is provided with the plurality of electric motors that rotationally drive it, and hence, in the motorized aircraft, the propulsion system propeller or fan is rotationally driven by the drive system including the electric motors. Thus, it is possible to ensure safety required of the aircraft.

Further, the total output of the plurality of electric motors and the required output of the aircraft body satisfy the relationship, Pmax(n−1)/n>Preq. Thus, even if output of one of the plurality of electric motors fails, it is possible for even only the other electric motors to satisfy the required output of the aircraft body by mechanically or electrically separating such an electric motor that fails the output. That is, it is accordingly possible to optimally set the output and number of electric motors that rotationally drive the propulsion system propeller or fan. Thus, it is possible to ensure safety while suppressing an increase in total weight.

In the motorized aircraft according to the embodiment of the present invention, the number of electric motors and the required output of the aircraft body satisfy the following relationship: $\sqrt{(0.15P\text{req})} \leq n \leq \sqrt{(0.15P\text{req})}+2$.

With this, it is possible to optimally set the number that depends on the required output of the aircraft body and to achieve both of high reliability and a reduction of the propulsion system weight, which are required of the aircraft.

The motorized aircraft according to the embodiment of the present invention includes a current detection means that detects a current of the electric motor, an rotations per minute (r.p.m.) detection means that detects r.p.m. of the electric motor, a storage unit that stores data of a characteristic data group, an airflow detection means that detects air density and airspeed, a propeller torque estimation unit, a motor torque estimation unit, and a comparison detection unit.

The propeller torque estimation unit estimates propeller torque of the propulsion system propeller on the basis of rotations per minute (r.p.m.) obtained from the r.p.m. detection means, data of the characteristic data group, and air density and airspeed obtained from the airflow detection means.

The motor torque estimation unit estimates motor torque on the basis of a current obtained from the current detection means and r.p.m. obtained from the r.p.m. detection means.

The comparison detection unit compares estimated propeller torque and estimated motor torque with each other and detects an abnormal state of the electric motor on the basis of the fact that a difference between the propeller torque and the motor torque (product of the motor torque by speed reduction ratio if speed reducer is applied) is above a predetermined value. Thus, it is possible to detect the abnormal state of the electric motor in real time without a special detection mechanism.

That is, a method of detecting demagnetization of a permanent magnet that is one of abnormal states of the electric motor has been disclosed in, for example, Japanese Patent Application Laid-open No. 2013-001185A. However, such a method is not applicable to an aircraft propulsion system whose load characteristics constantly change in a manner that depends on not only the speed but also the temperature and altitude. Thrust control is difficult because it is difficult to detect an abnormal state and identify an electric motor in the abnormal state as described above in the case of trouble. Thus, an increase in workload is inevitable because a pilot has to compensate for aircraft body control. In addition, regarding an aircraft body having a varied propulsion system arrangement, there is a risk that stability of the aircraft body may be deteriorated due to ununiform thrust distribution caused by uncontrolled thrust.

In contrast, in the motorized aircraft according to the embodiment of the present invention, the above configuration makes it possible to quickly cope with the abnormal state of the electric motor, and hence it is possible to ensure safety. That is, in accordance with the present invention, the following motorized aircraft can be provided. Specifically, by optimizing the output and number of electric motors that rotationally drive the propulsion system propeller or fan in the motorized aircraft, safety is ensured while suppressing an increase in total weight. Further, an abnormal state is correctly detected and an electric motor in the abnormal state is identified. Aircraft body behaviors including the thrust distribution is prevented from changing even during the occurrence of the abnormal state. An increase in workload on a pilot is prevented.

The motorized aircraft according to the embodiment of the present invention includes a drive control means that controls the electric motors. The comparison detection unit identifies an electric motor of the plurality of electric motors, in which the abnormal state occurs, on the basis of the fact that a difference of a linear sum between estimated propeller torque and estimated motor torque is above a predetermined value when the drive control means provides each of the electric motors with a motor torque-changing command. Thus, as described above, when the abnormal state of the electric motor is detected in real time, an electric motor in the abnormal state can be identified without individually providing the plurality of electric motors with detection mechanisms.

With this, it is possible to correctly cope with a particular electric motor in an abnormal state. In addition, it is possible to ensure safety.

In the motorized aircraft according to the embodiment of the present invention, the drive control means provides each of the electric motors with a motor torque-changing command for maintaining r.p.m. of the propulsion system propeller or fan. Thus, the electric motor in which the abnormal state occurs is identified, and hence the r.p.m. of the propulsion system propeller or fan is hardly changed in an identification sequence. Thus, it is possible to suppress a change of the behaviors of the aircraft body and to more quickly identify the electric motor in which the abnormal state occurs.

In the motorized aircraft according to the embodiment of the present invention, the electric motor has a function of generating power through rotation of the propulsion system propeller or fan. Further, the drive control means makes, when causing the electric motors to generate power through rotation of the propulsion system propeller or fan, control such that a distribution rate of motor torque of the plurality of electric motors differs from that during driving. Thus, it is possible to enhance total power generation efficiency of the plurality of electric motors.

In the motorized aircraft according to the embodiment of the present invention, at least one of the plurality of electric motors rotationally drives the propulsion system propeller or fan via a one-way clutch. Thus, even if the r.p.m. is lowered or zero due to the abnormal state of the electric motor, it does not act on the propulsion system propeller or fan as a brake, and it is possible to mechanically and quickly ensure safety before electrically controlling it.

Further, the electric motor that rotationally drives the propulsion system propeller or fan via the one-way clutch has a function of generating power through rotation of the propulsion system propeller or fan. When power is generated through rotation of the propulsion system propeller or fan, the rate of motor torque automatically becomes zero, and control of the distribution rate of motor torque of the plurality of electric motors can be simplified.

The motorized aircraft according to the embodiment of the present invention further includes an abnormal-case computation unit. The abnormal-case computation unit calculates a torque difference between estimated propeller torque and a linear sum of motor torque of the electric motors excluding the electric motor in which the abnormal state occurs, and estimates torque of the electric motor in which the abnormal state occurs on the basis of the torque difference. With this, it is possible to identify the degree of abnormality of the electric motor in the abnormal state without providing individual electric motors with detection mechanisms.

With this, it is possible to correctly take an action regarding to what extent the electric motor in the abnormal state to be used, for example, completely separating it or continuing using it with certain output. In addition, it is possible to ensure safety.

In the motorized aircraft according to the embodiment of the present invention, the drive control means causes the comparison detection unit to operate at a plurality of different r.p.m. of the propulsion system propeller or fan to calculate an abnormal-case data group regarding a relationship between motor torque of an electric motor in which an abnormal state occurs and r.p.m. of the propulsion system propeller or fan. With this, it is possible to acquire data regarding characteristics of the electric motor in the abnormal state without providing individual electric motors with detection mechanisms.

In the motorized aircraft according to the embodiment of the present invention, the drive control means makes control such that thrust or propeller torque before occurrence of an abnormal state is maintained within a predetermined range, on the basis of the characteristic data group and the abnormal-case data group. With this, even if an abnormal state occurs, a change of the behaviors of the aircraft body is automatically suppressed and control is continued. Thus, it is possible to prevent an increase in workload on a pilot and ensure safety.

In the motorized aircraft according to the embodiment of the present invention, the motorized aircraft includes a plurality of propellers or fans, and the drive control means makes control such that a difference between a value of a moment acting on the aircraft body after occurrence of an abnormal state of the electric motor and a value of a moment acting on the aircraft body before the occurrence is maintained within a predetermined range. With this, also in the multi-engine aircraft including a plurality of propellers, a change of the behaviors of the aircraft body is automatically suppressed and control is continued. Thus, it is possible to further prevent an increase in workload on a pilot and ensure safety.

Figure 2:
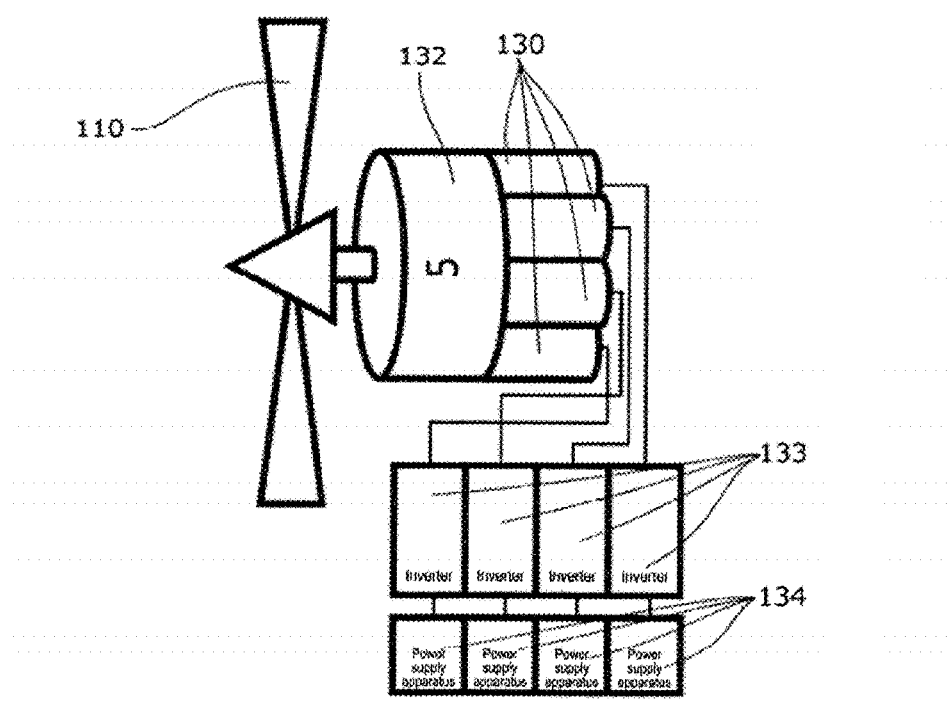
FIG. 2 A schematic configuration explanatory diagram of another example of the basis form of the propulsion system of the motorized aircraft according to the present invention.

Next, FIGS. 1 and 2 show the outline of a propulsion system of a motorized aircraft according to the present invention.

A propeller 110 that is the propulsion system propeller is driven by a plurality of electric motors 130. Note that the present invention is applicable to not only the propeller but also a fan of the motorized aircraft Here, the fan is, for example, a propulsion apparatus constituted of rotating rotor blades, stator blades mounted in a downstream of the rotor blades, and a duct covering their outer periphery.

In the example shown in FIG. 1, the plurality of electric motors 130 are arranged in series at multiple stages and the propeller 110 is directly driven.

In the example shown in FIG. 2, the plurality of electric motors 130 are arranged in parallel and the propeller 110 is driven via a power transmission mechanism 132.

Each electric motor 130 is supplied with electricity from a power supply apparatus 134 via an inverter 133.

A manned aircraft whose trouble is directly related to human lives is required to provide much higher reliability in comparison with the unmanned aircraft.

Figure 3:
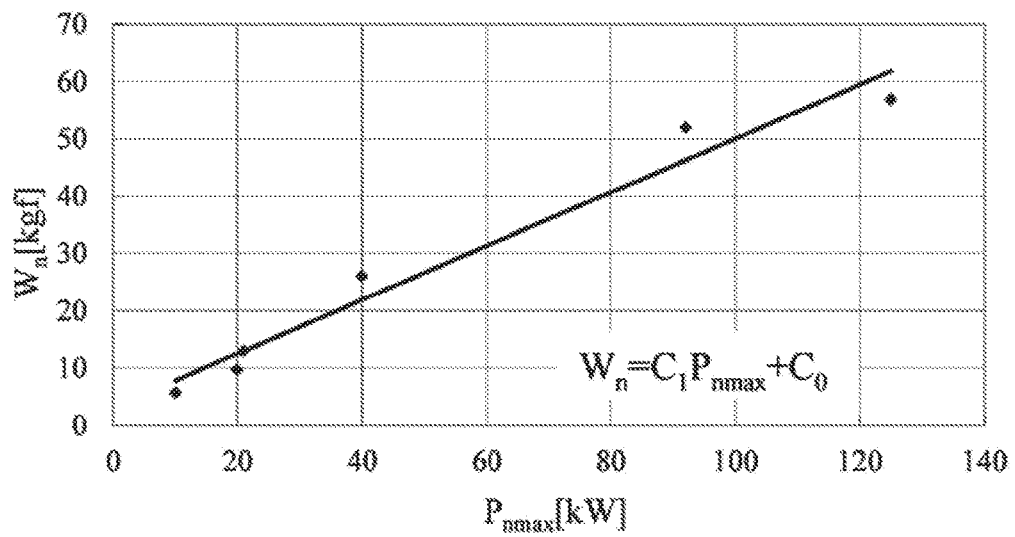
FIG. 3 A graph of a relationship between total weight and maximum output of an electric motor and an inverter.

With a general manned aircraft, the propeller that drives a propulsion unit often needs engines each having about 20 kW or more during take-off and climb. As shown in FIG. 3, regarding electric motors used for them, a weight sum Wn [kgf] of the electric motors and inverters substantially linearly transitions with respect to maximum output Pnmax [kW] of each electric motor.

At this time, a relationship among the number n of electric motors, the weight sum Wn of the electric motors and the inverters, and propulsion system weight Wth [kgf] is $Wth = n*Wn$.

In addition, as shown in FIG. 3, with output of about 10 kW or more, assuming that maximum output Pnmax of each electric motor is maximum output at each stage, it can be approximated as $Wn = C_1 * Pn\max + C_0$ ($C_0 = 3.125$ [kgf], $C_1 = 0.469$ [kgf/kW]).

Further, in preparation for the case where a failure occurs at a single stage, the total maximum output Pmax [kW] of the propulsion system needs to satisfy the following expression for maintaining required output Preq [kW] of the propulsion system.

$P\max(n-1)/n \geq Preq$

The required output Preq of the propulsion system is an output value required to be able to be output also during the occurrence of an abnormality. The required output Preq corresponds to, for example, a minimum output necessary for take-off and climb. The required output Preq depends on specifications such as aircraft body shape, aircraft body weight, wing type, wing shape, and wing area.

Here, $P\max = n*Pn\max$,

When the above equation is established, the propulsion system weight Wth is minimum in the number n of electric motors. Thus, $$P\max(n-1)/n = n*Pn\max(n-1)/n$$
$$= (n-1)Pn\max$$
$$= (n-1)(Wn - C_0)/C_1$$
$$= (n-1)(Wth/n - C_0)/C_1$$
$$= Wth(n-1)/C_1 n - C_0(n-1)/C_1$$
$$= Preq$$

$Wth(n-1)/C_1 n = Preq + C_0(n-1)/C_1$ $Wth = C_1 * Preq * n/(n-1) + C_0 n$

Thus, the number nopt of electric motors that minimizes the propulsion system weight Wth is $$\partial Wth/\partial n = -C_1 * Preq/(n-1)^2 + C_0$$
$$= 0.$$

Thus, $(nopt-1)^2 = C_1 Preq/C0$ $nopt = \sqrt{(C_1 Preq/C_0)} + 1$.

Figure 4:
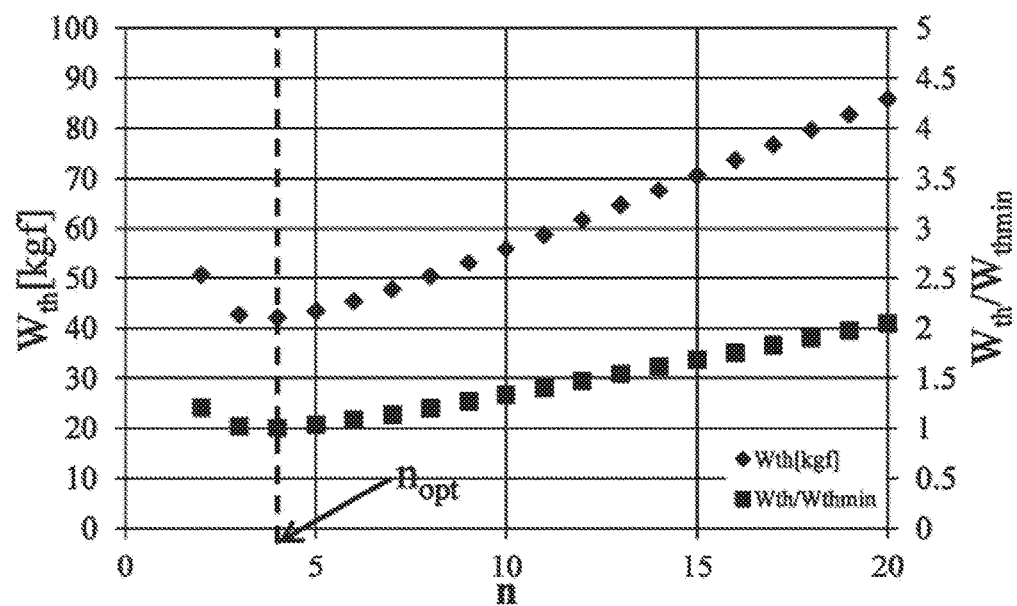
FIG. 4 A graph of a relationship between propulsion system weight and the number of electric motors.
Figure 5:
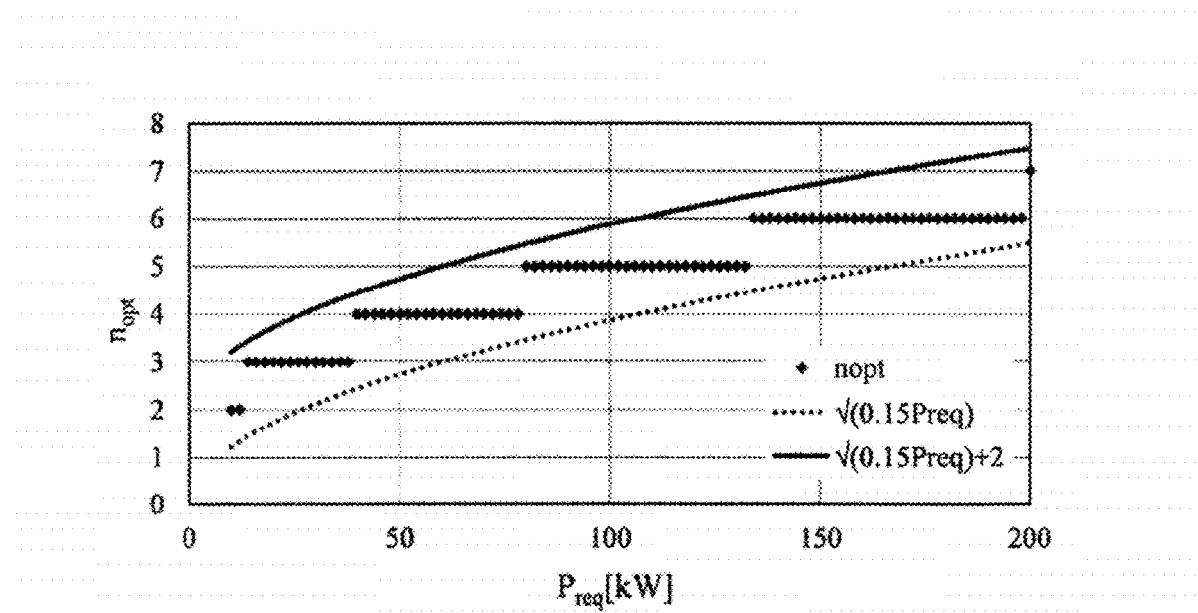
FIG. 5 A graph of a relationship between required output and the number of lightest electric motors.

Here, when $C_0 = 3.125$ [kgf] and $C_1 = 0.469$ [kgf/kW] are substituted and the number of lightest electric motors nopt is selected, a relationship among the required output Preq, the propulsion system weight Wth, and the number of lightest electric motors nopt is as shown in FIGS. 4 and 5, that is $\sqrt{(0.15 Preq)} \leq nopt \leq \sqrt{(0.15 Preq)} + 2$.

Thus, with the above configuration, it is possible to achieve both of the high reliability and the reduction of the propulsion system weight, which are required of the manned aircraft.

The above will be described further in detail for the sake of easy understanding.

The electric motor has higher reliability even per se. However, an abnormality or a symptom thereof (hereinafter, abnormal state) such as demagnetization of the permanent magnet and burning of the coil may occur in the electric motor. In particular, an abnormal state in a manned aircraft is directly related to human lives, and hence the manned aircraft is required to provide much higher reliability. In view of this, in this embodiment, in order to enhance the reliability, a single propulsion unit (propeller 110) is driven by a plurality of electric motors and the number n of electric motors is set to be one more than the number of electric motors necessary for required output ($P\max(n-1)/n \geq preq$).

With this, even if output of one of the plurality of electric motors fails, the required output of the aircraft body Preq [kW] can be satisfied only by the other electric motors. Thus, in this embodiment, it is possible to ensure safety strictly required of the motorized aircraft (including manned aircraft and unmanned aircraft). It can promote the spread of motorized aircrafts such as small aircrafts.

Here, it is conceivable that, it is possible to detect an abnormal state and correctly identify an electric motor in the abnormal state when the abnormal state occurs in the certain electric motor, the safety can be further enhanced by electrically or mechanically separating the electric motor. A method of identifying the electric motor in the abnormal state will be described later in detail.

Here, as in this embodiment, when the single propulsion unit (propeller 100) is driven by the plurality of electric motors, there is a demerit that the total weight (propulsion system weight Wth) of the electric motors and the inverters increases in comparison with a single propulsion unit driven by a single electric motor. Therefore, from the perspective of the weight, it is more advantageous to suitably set the number of electric motors (and inverters)

It will be specifically described with an example. For example, it is assumed that the required output of the aircraft body Preq (required output of single propulsion unit) is 50 kw. In this case, for example, when the number n of electric motors each having 25 kw is three and when the number n of electric motors each having 10 kw is six, the propulsion system weight Wth (weight Wn of set of electric motor and inverter multiplied by number n of sets) differs.

Note that, when the number n of electric motors each having 25 kw is three, if an abnormal state occurs in a certain electric motor, the required output of 50 kw (=2*25 kw) is compensated for by the other two electric motors. Further, when the number of electric motors each having 10 kw is six, if an abnormal state occurs in a certain electric motor, the required output of 50 kw (=5*10 kw) is compensated for by the other five electric motors.

While the propulsion system weight Wth differs in a manner that depends on the number n of electric motors (and inverters), it is expressed by the horizontal axis, the vertical axis on the left-hand side, and the diamond-shaped plots of FIG. 4. The diamond-shaped plots of FIG. 4 show a state obtained when, in the above expression of Wth=$C_1$*Preq*n/(n−1)+$C_0$n, $C_0$=3.125 [kgf], $C_1$=0.469 [kgf/kW], and Preq=50 [kw] are set and n (integer) is changed from 2 to 20, In the diamond-shaped plots of FIG. 4, where n=2, that is, when the single propulsion unit is driven by two electric motors each having 50 kw, the propulsion system weight Wth is about 50 kgf (i.e., weight Wn of set of electric motor and inverter is about 25 kgf: also see FIG. 3). Further, where n=3, that is, when the single propulsion unit is driven by three electric motors each having 25 kw, the propulsion system weight Wth is about 43 kgf (i.e., weight Wn of set of electric motor and inverter is about 14.3 kgf: also see FIG. 3).

Further, where n=4, that is, when the single propulsion unit is driven by four electric motors each having 16.7 kw, the propulsion system weight Wth is about 42 kgf (i.e., weight Wn of set of electric motor and inverter is about 10.5 kgf: also see FIG. 3).

In the case where the required output Preq is 50 kw, when the number n of electric motors (and inverters) is four, the propulsion system weight Wth is a smallest value (minimum value), which is about 42 kgf. That is, when the required output Preq is 50 kw, the number of lightest electric motors nopt is four. Then, when the number n of electric motors (and inverters) is four or more, the propulsion system weight Wth monotonically increases as n increases.

Next, a reference will be made to the horizontal axis, the vertical axis on the right-hand side, and the square plots of FIG. 4. The square plots express a ratio of the propulsion system weight Wth obtained when minimum propulsion system weight Wthmin (i.e., about 42 kgf where n=4) is set as a reference.

For example, the propulsion system weight Wth where n=2 is about 1.2 times as large as the minimum propulsion system weight Wthmin (n=4). Further, for example, the propulsion system weight Wth where n=20 is about twice as large as the minimum propulsion system weight Wthmin (n=4).

Here, with respect to the expression of Wth=$C_1$*Preq*n/(n−1)+$C_0$n (see diamond-shaped plots of FIG. 4), by partially differentiating this Wth by n and partially differentiating a value that makes the partial differentiation expression equal to 0, the number of lightest electric motors nopt can be determined. That is, as described above, nopt=√($C_1$Preq/$C_0$)+1. It should be noted that nopt is an integer, and hence, in this embodiment, a range is set for nopt.

This range is √(0.15 Preq)≤nopt≤√(0.15Preq)+2 described above, it is shown in FIG. 5.

It can be seen from FIG. 5 that the number of lightest electric motors nopt depends on the required output Preq. For example, when the required output Preq is 50 kw, the number of lightest electric motors nopt is four. When the required output Preq is 100 kw, the number of lightest electric motors nopt is five. Further, for example, when the required output Preq is 150 kw, the number of lightest electric motors nopt is six. Note that, the required output Preq is fixed to 50 kw in the above discussion referring to FIG. 4.

Here, regarding each required output Preq, there are two integers equal to or larger than √(0.15Preq) and equal to or smaller than √(0.15Preq)±2. Out of the two integers, an integer that minimizes the propulsion system weight Wth is the number of lightest electric motors nopt. This nopt is typically selected as the number of electric motors n. It should be noted that, the other integer of the two integers within the above range may be selected as the number n of electric motors.

Referring to FIG. 5, it will be described specifically. In FIG. 5, when the required output Preq is 50 kw, there are two integers within a range equal to or larger than √(0.15Preq) (=2.74) and equal to or smaller than √(0.15Preq)+2(=4.74), that are 3 and 4. Out of the two integers, an integer, 4 that minimizes the propulsion system weight Wth is the number of lightest electric motors nopt. This nopt is typically selected as the number of electric motors n. Referring to FIG. 4, the propulsion system weight in this case is about 42 kgf.

On the other hand, when the other integer, 3 within the above range is selected as the number n of electric motors, the propulsion system weight is about 43 kgf (see FIG. 4). That is, when the other integer within the above range is selected as the number n of electric motors, the weight increases in some degree while there is no significant difference therebetween in comparison with the number of lightest electric motors nopt selected as the number n of electric motors.

Thus, when an integer within the range equal to or larger than √(0.15Preq) and equal to or smaller than √(0.15Preq)+2 is selected as the number n of electric motors, it is possible to achieve both of the safety and the reduction of the propulsion system weight, which are strictly required of the aircraft.

Next, a basic outline of control of the motorized aircraft according to the present invention will be described with an example in which an electric motor 130 is provided.

Figure 6:
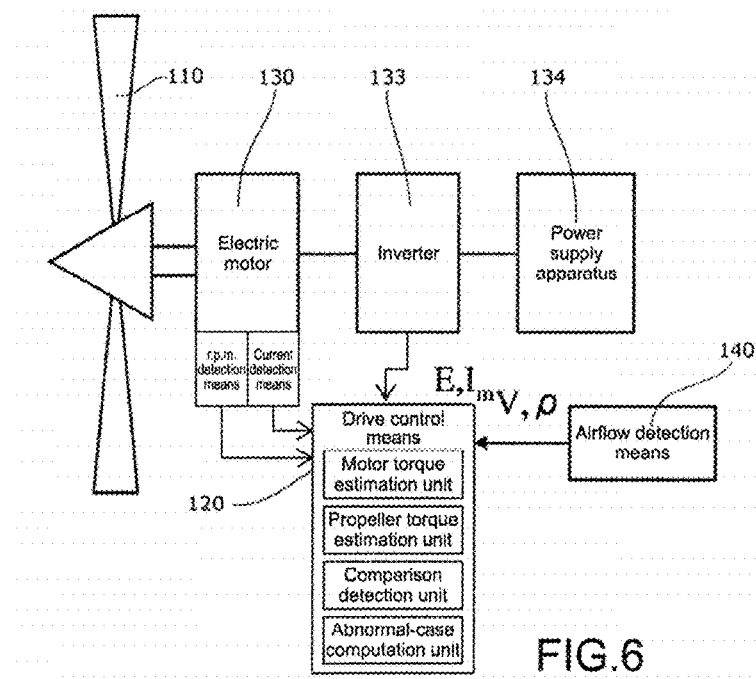
FIG. 6 A conceptual diagram of control of the motorized aircraft.

As shown in FIG. 6, the propeller 110 is driven by the electric motor 130. The electric motor 130 is rotated by electricity supplied from the power supply apparatus 134 via the inverter 133.

A drive control means 120 includes a motor torque estimation unit (not shown). The motor torque estimation unit estimates motor torque τm on the basis of a voltage E, current Im obtained from a current detection means that detects a current of the electric motor (not shown) and r.p.m. N obtained from an r.p.m. detection means that detects r.p.m. of the electric motor (not shown).

Figure 7:
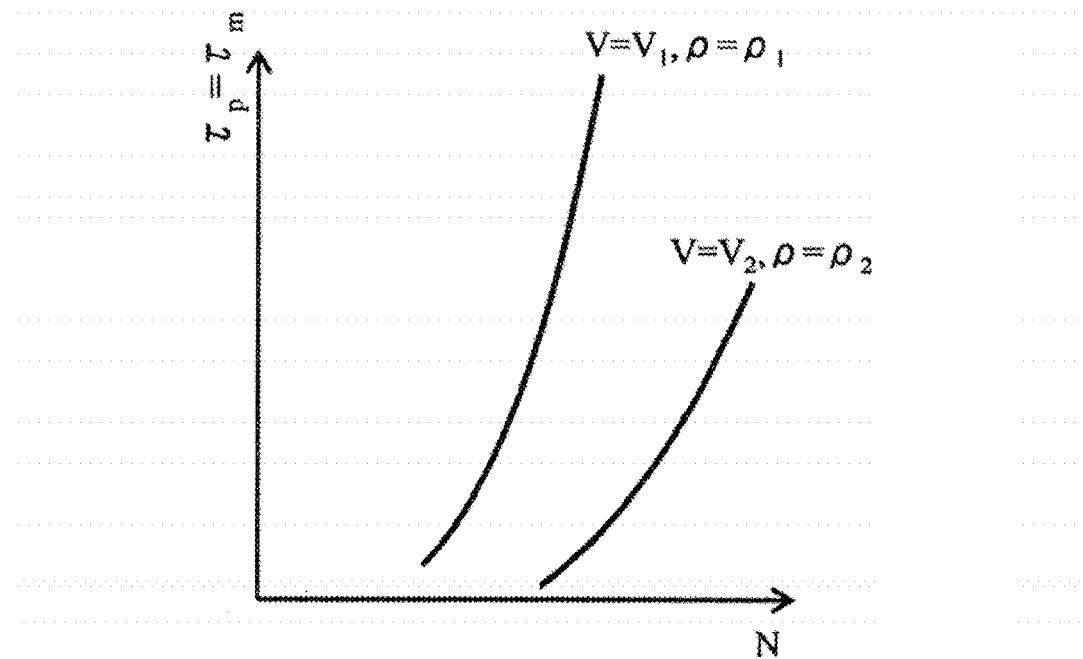
FIG. 7 A graph of a relationship between rotations per minute (r.p.m.) and torque.

Further, the drive control means 120 includes a propeller torque estimation unit (not shown). The propeller torque estimation unit estimates propeller torque τp on the basis of airspeed V, air density ρ obtained from an airflow detection means 140, the above-mentioned r.p.m. N, and a relationship between the r.p.m. N and the propeller torque τp on a characteristic data group regarding a torque characteristic of the propulsion system propeller, which is recorded in advance as shown in FIG. 7.

If trouble occurs, for example, if the permanent magnet of the electric motor 130 is demagnetized due to heat generated inside the electric motor 130, the motor torque τm decreases while an estimated value τm' of the motor torque does not change.

However, even if trouble occurs, the relationship of τp=τm does not change. Therefore, correspondingly to the reduction of the propeller torque τp, the r.p.m. of the propeller 110 changes from a value $N_0$ before the occurrence of trouble to $N_1$.

At this time, a difference occurs between an estimated value τp' of the propeller torque τp changing corresponding to $N_1$ and the estimated value τm' of the motor torque. When this value exceeds a certain threshold Δτ, a comparison detection unit (not shown) provided to the drive control means 120 considers the electric motor 130 as being in an abnormal state.

In general, the permanent magnet is demagnetized at a high temperature. If it exceeds a certain temperature, the permanent magnet is irreversibly damaged, which cannot be repaired even when the temperature decreases. However, if an increase in temperature is within a certain range, it can be repaired when the temperature decreases. Therefore, by setting the threshold Δτ to be significantly small, it is possible to detect a symptom of demagnetization before the damage of the permanent magnet becomes irreversible.

Schematic configurations of first to fourth embodiments of the propulsion system of the motorized aircraft according to the present invention are shown in FIGS. 8 to 11.

Figure 8:
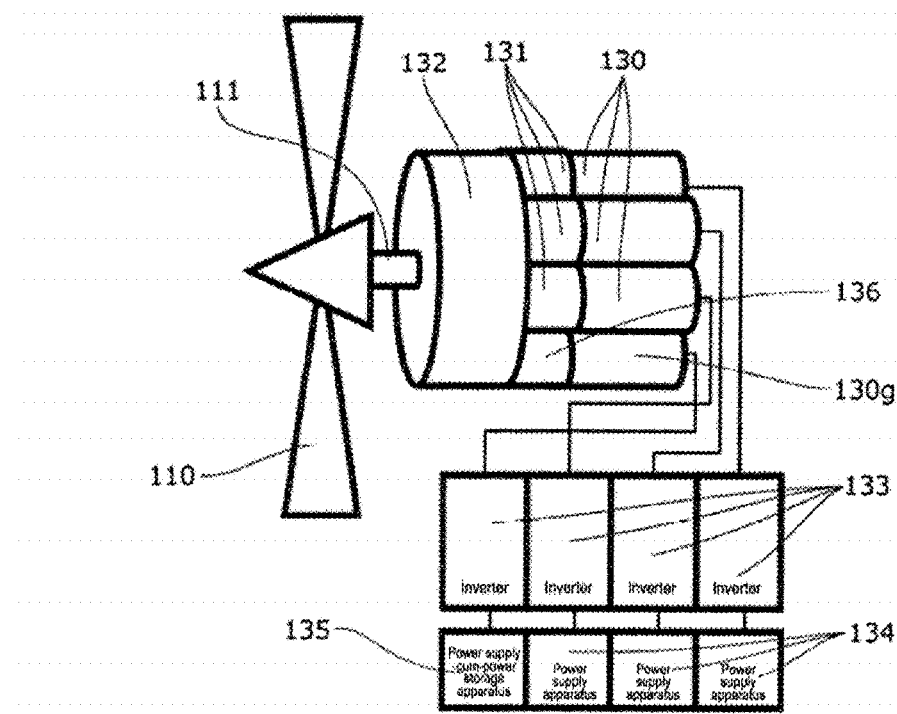
FIG. 8 A schematic configuration explanatory diagram of a first embodiment of the propulsion system of the motorized aircraft according to the present invention.
Figure 9:
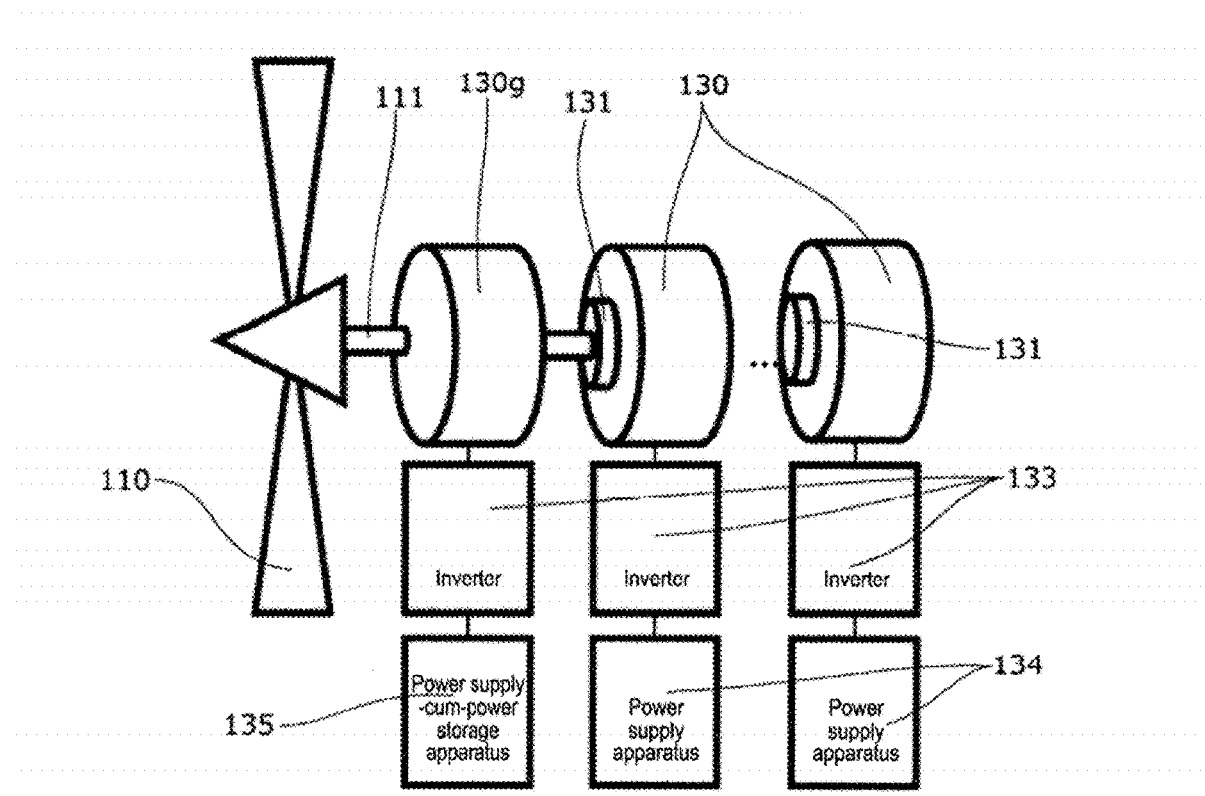
FIG. 9 A schematic configuration explanatory diagram of a second embodiment of the propulsion system of the motorized aircraft according to the present invention.
Figure 10:
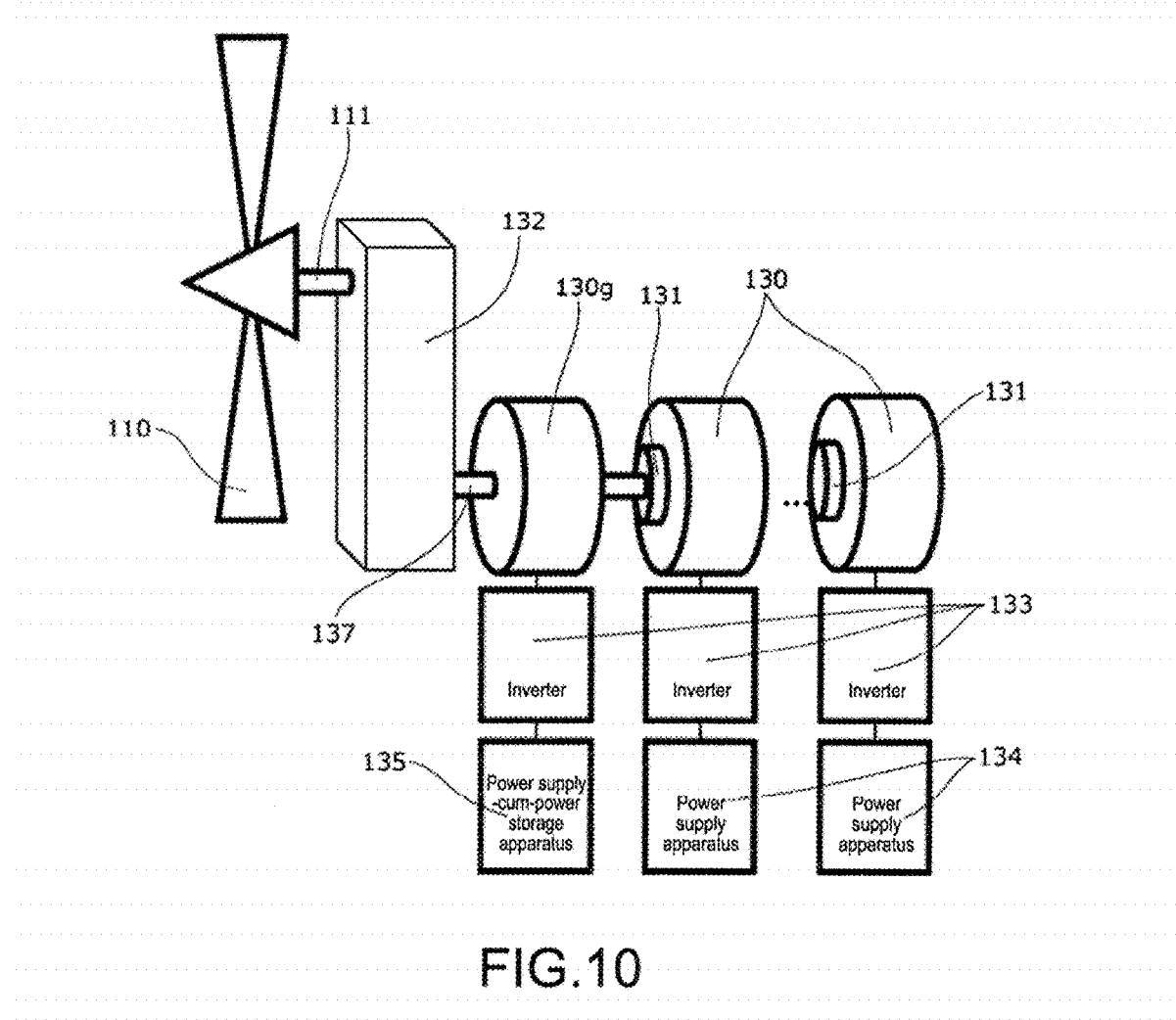
FIG. 10 A schematic configuration explanatory diagram of a third embodiment of the propulsion system of the motorized aircraft according to the present invention.

In the first to third embodiments, as shown in FIGS. 8 to 10, the propeller 110 includes the plurality of electric motors 130 and a regenerative electric motor 130g. The plurality of electric motors 130 are supplied with electricity from the power supply apparatuses 134 via the inverters 133. The regenerative electric motor 130g is supplied with electricity from a power supply-cum-power storage apparatus 135 via the inverters 133 and regenerates electricity to the power supply-cum-power storage apparatus 135 via the inverters 133 during power generation.

Figure 11:
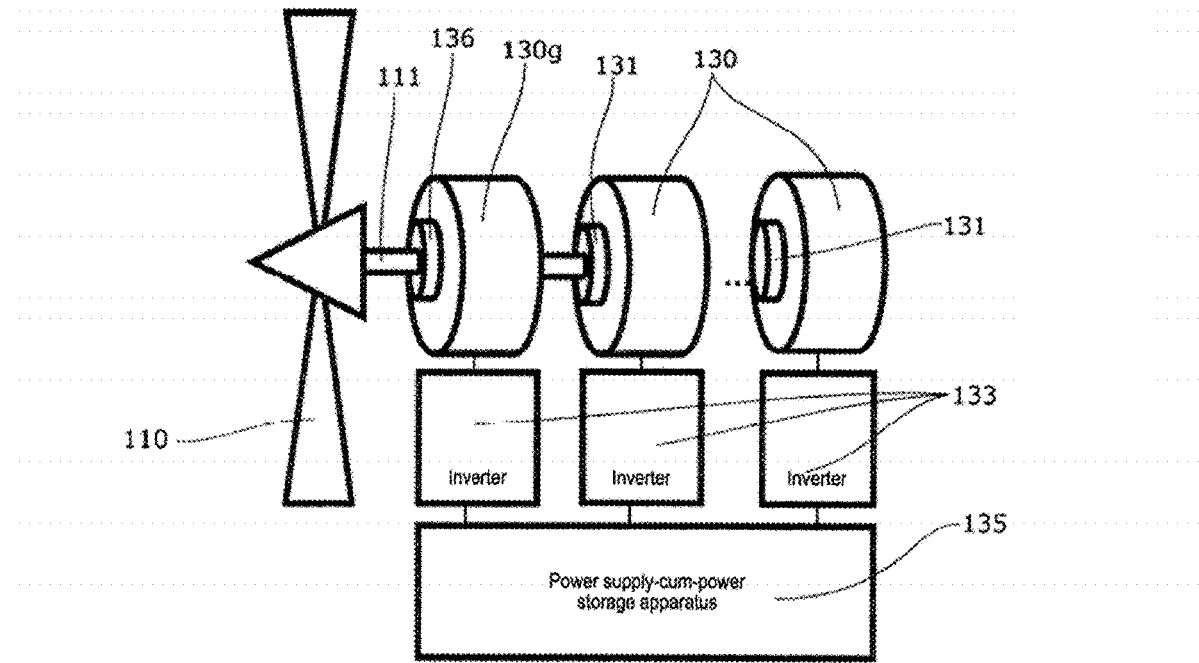
FIG. 11 A schematic configuration explanatory diagram of a fourth embodiment of the propulsion system of the motorized aircraft according to the present invention.

Further, in the fourth embodiment, as shown in FIG. 11, the power supply-cum-power storage apparatus 135 is commonly connected to the inverters 133 for all the electric motors 130 and the regenerative electric motor 130g.

The regenerative electric motor 130g has a characteristic in that it has higher efficiency in a low-torque range than those of the other electric motors 130.

In the first embodiment, as shown in FIG. 8, a power shaft 111 linking with the propeller 110 is rotationally driven by the plurality of electric motors 130 provided in parallel and the regenerative electric motor 130g via the power transmission mechanism 132.

The regenerative electric motor 130g is connected to the power transmission mechanism 132 via a clutch 136. The other electric motors 130 are connected to the power transmission mechanism 132 via one-way clutches 131.

In the second embodiment, as shown in FIG. 9, the regenerative electric motor 130g is directly coupled to the power shaft 111 linking with the propeller 110. The other electric motors 130 are connected to the power shaft 111 via the one-way clutches 131.

In the third embodiment, as shown in FIG. 10, the power shaft 111 linking with the propeller 110 is rotationally driven by a motor output shaft 137 via the power transmission mechanism 132.

The regenerative electric motor 130g is directly coupled to the motor output shaft 137. The other electric motors 130 are connected to the motor output shaft 137 via the one-way clutches 131.

In the fourth embodiment, as shown in FIG. 11, the regenerative electric motor 130g is connected to the power shaft 111 linking with the propeller 110 via the clutch 136. The other electric motors 130 are connected to the power shaft 111 via the one-way clutches 131.

Note that the power transmission mechanism 132 of each of the first embodiment and the third embodiment may be any mechanism such as a chain, a belt, and a gear and may also serve as a speed reduction mechanism.

It is well-known that the motorized aircraft in which the propeller is driven by the electric motors is capable of regenerating wind energy, which is input into the propeller, as electric energy.

That regenerative power becomes maximum at an operating point where torque is much smaller in comparison with a driving-time operating point. Therefore, for increasing regeneration efficiency, it is more advantageous to concentrate on torque to elements that is highly efficient at a regeneration-time operating point rather than distributing torque into numerous electric generator elements.

However, at a regeneration-time operating point, the r.p.m. does not significantly change from that during driving. Therefore, the r.p.m. of the propeller suddenly increases during gliding and increase in speed or in the case of a sudden gust of wind, and the electric motor is likely to have trouble due to overspeed.

Figure 12:
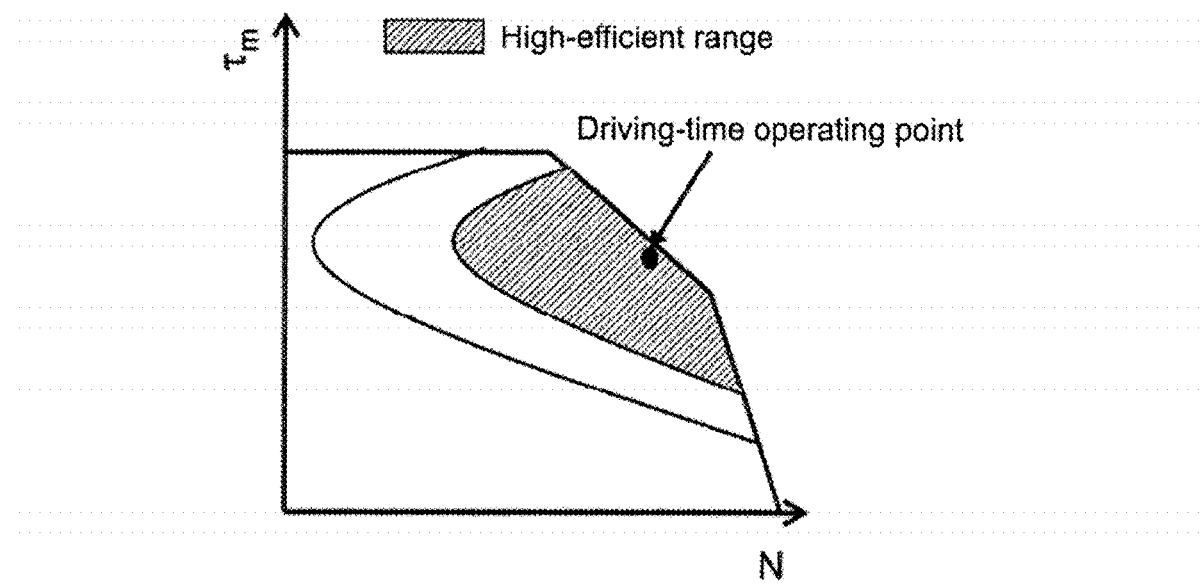
FIG. 12 A graph of a characteristic of an electric motor having high efficiency at a driving-time operating point.
Figure 13:
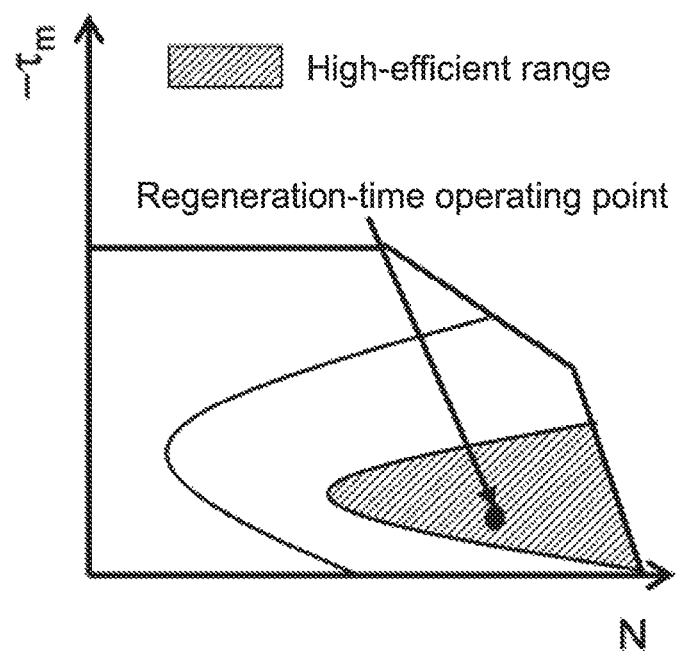
FIG. 13 A graph of a characteristic of an electric motor having high efficiency at a regeneration-time operating point.

In view of this, in the first to fourth embodiments, each of the electric motors 130 is set have high efficiency at a driving-time operating point as shown in FIG. 12, and regeneration torque of the regenerative electric motor 130g is set to have high efficiency at a regeneration-time operating point as shown in FIG. 13. The plurality of electric motors 130 are connected to the power shaft 111 or the motor output shaft 137 via the one-way clutches 131.

With this, it is possible to cause torque to concentrate on the regenerative electric motor 130g during regeneration and to prevent the overspeed of the electric motors 130 during gliding and increase in speed and in the case of a sudden gust of wind. In addition, it is possible to provide a special effect of preventing propulsion system trouble if, for example, a failure occurs in any one of the electric motors 130 and braking torque is generated.

Figure 14:
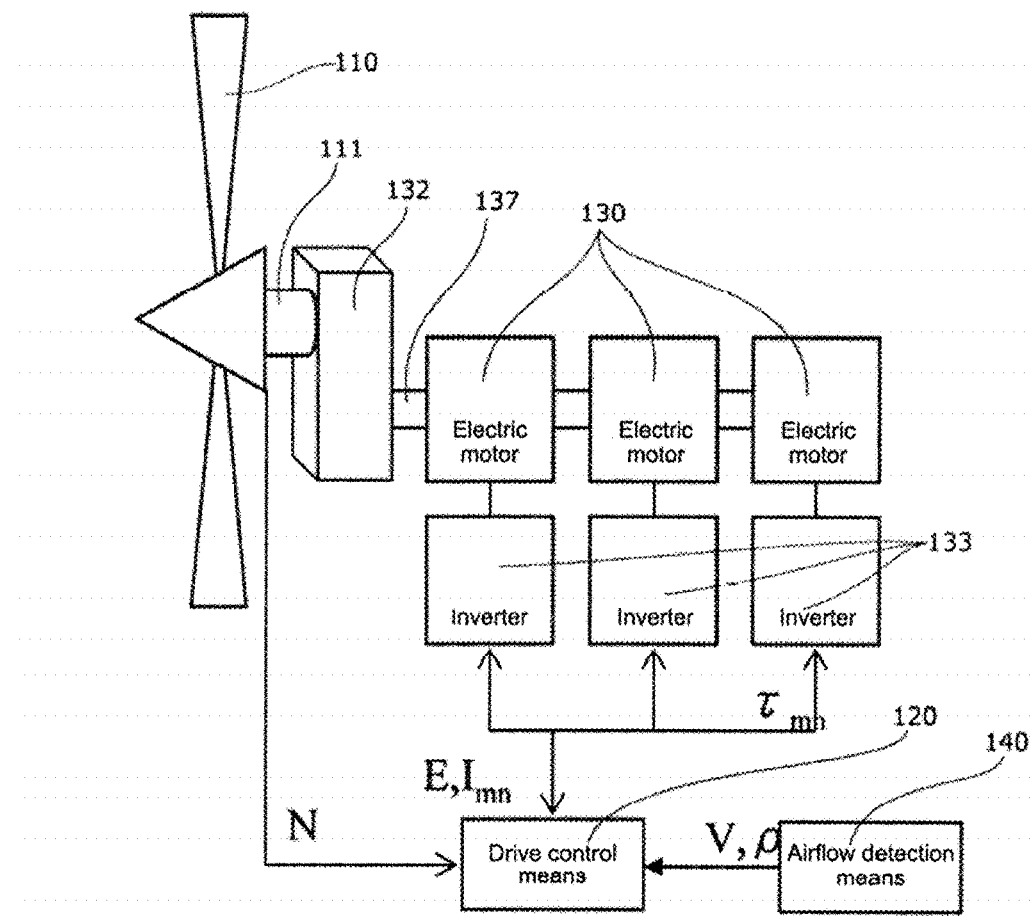
FIG. 14 A schematic configuration explanatory diagram of a control model of the motorized aircraft according to the present invention.
Figure 19:
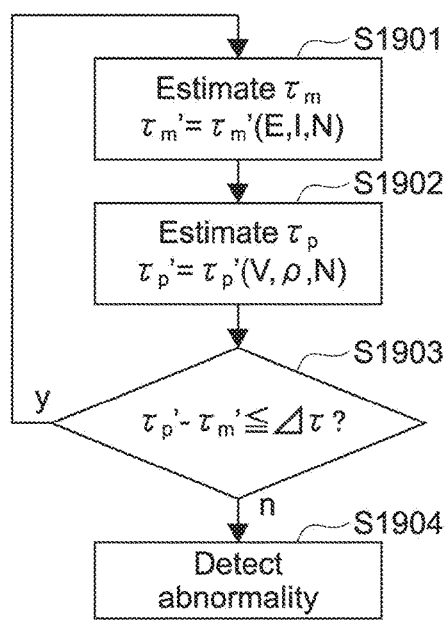
FIG. 19 A flowchart showing an operation of abnormality detection in the control model of the motorized aircraft according to the present invention.
Figure 20:
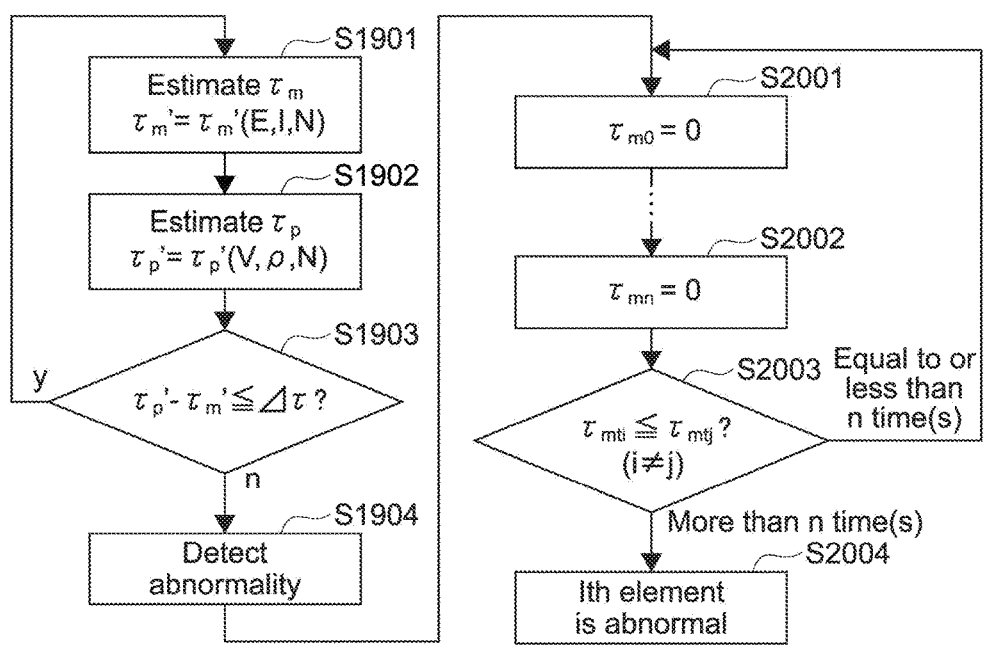
FIG. 20 A flowchart showing an operation of abnormality detection and abnormal-part identification in the control model of the motorized aircraft according to the present invention.

Next, a description of the outline of control of the motorized aircraft according to the present invention will be made with reference to a model as shown in FIG. 14 and flowcharts shown in FIGS. 19 and 20.

Since the propeller 110 is driven by the plurality of electric motors 130, when all the electric motors 130 normally rotate in a steady state, the sum of motor torque $\tau mn$ of the electric motors 130 (when power transmission mechanism 132 also serves as speed reducer, product of its speed reduction ratio) $\tau m$ and the propeller torque $\tau p$ are equal to each other. However, when an abnormal state occurs in any of the electric motors 130, the electric motor 130 in the abnormal state decreases in torque or produces braking torque, which leads to $\tau p > \tau m$. Then, the r.p.m. and the thrust of the propeller 110 cannot be maintained. The workload on the pilot increases because the pilot has to conduct correction operations.

In addition, there is a risk that the abnormal state of the electric motor 130 may induce a failure of the power supply system (not shown in FIG. 14) or the inverter 133, and hence it is necessary to quickly identify the electric motor 130 in the abnormal state.

In this embodiment, when the electric motors 130 operate in a steady state with no abnormality and the inverters 133 drive the electric motors 130 by using an r.p.m. control method, the drive control means 120 sends command values of the r.p.m. N to the inverters 133 while keeping the r.p.m. N within a certain range. The inverters 133 control the electric motors 130 such that the r.p.m. does not depart from N.

When all the electric motors 130 and the inverters 133 normally operate in a steady state, the r.p.m. N of the propeller 110 is maintained. If an abnormal state occurs in an i'th electric motor 130, torque $\tau mi'$ of the i'th electric motor 130 decreases or becomes braking torque. As a result, torque $\tau mn$ of each electric motor 130 increases to maintain the r.p.m. N, and a difference occurs between the estimated value $\tau p$ of the propeller torque at the r.p.m. N (Step 1902) and the linear sum $\tau p$ of the estimated value of $\Sigma mn$ (Step 1901).

When such a difference exceeds a certain threshold $\Delta\tau$ (Step 1903), it is determined that an abnormal state (abnormality or symptom thereof) occurs in any of the electric motors 130 (Step 1904).

When the abnormal state is detected, the drive control means 120 individually changes a torque command value for each of the electric motors 130.

For example, provided that a total n-number of electric motors 130 and inverters 133 have all identical output characteristics, the drive control means 120 sets, at intervals of a certain time, $$\tau mi=0, \ldots (i=1,2, \ldots n)$$

$$\tau mj=\tau p/(n-1) \ldots (i \neq j)$$

and a torque command value for only one electric motor 130 to values different from those of the other elements.

That is, in order to identify the i'th electric motor 130 of the plurality of electric motors 130, in which the abnormal state occurs, the drive control means 120 executes the following processing. First of all, the drive control means issues a torque command value of 0 to an electric motor (i=1st electric motor) ($\tau mi=0$), and issues a torque command value of $\tau p/(n-1)$ to each of the other electric motors (j=2nd to nth electric motors) ($\tau mj=\tau p/(n-1)$). In accordance with such torque command values, processing of, for example, driving each electric motor is continuously performed for a predetermined time (e.g., about 0.5 seconds).

At this time, the motor torque estimation unit of the drive control means executes processing of, for example, estimating motor torque $\tau mn$ of each electric motor on the basis of the voltage E, current Im of each electric motor, which is obtained from the current detection means, and the r.p.m. N of each electric motor, which is obtained from the r.p.m. detection means. Then, the drive control means adds estimated values of the obtained motor torque $\tau mn$ of the electric motors and calculates a linear sum $\tau ti$ (i=1) of the estimated values of $\tau mn$. A first sample can thus be obtained (Steps 2001 and 2002).

When the above-mentioned predetermined time (e.g., about 0.5 seconds) has elapsed, the drive control means issues a torque command value of 0 to an electric motor (i=2nd electric motor) different from the electric motor to which the above-mentioned torque command value of 0 has been issued ($\tau mi=0$), and issues a torque command value of $\tau p/(n-1)$ to each of the other electric motors (j=1st and 3rd to nth electric motors) ($\tau mj=\tau p/(n-1)$).

Then, in the same manner as described above, the motor torque estimation unit of the drive control means executes processing of, for example, estimating motor torque $\tau mn$ of each electric motor. Then, the drive control means adds the estimated values of the obtained motor torque $\tau mn$ of the electric motors and calculates a linear sum $\tau ti$ (i=2). A second sample is thus obtained (Steps 2001 and 2002).

The above-mentioned processing is repeated by n time(s). An n-number of samples, that is, an n-number of linear sums $\tau ti$ (i=1, 2, . . . n) can thus be obtained.

When a linear sum $\tau ti$ of the n-number of linear sums $\tau ti$ (i=1, 2, . . . ), which has a minimum value, is an i'th linear sum $\tau ti'$ (Step 2003), the drive control means determines that this i'th electric motor 130 is the electric motor 130 in the abnormal state having a higher degree of decrease in torque (Step 2004).

In this embodiment, the electric motor 130 in the abnormal state can be correctly, identified by the processing as described above. Thus, for example, safety of the motorized aircraft can be further enhanced by electrically or mechanically separating that electric motor (e.g., issuing a torque command value of 0 to the power supply motor in the abnormal state).

When the electric motor 130 in the abnormal state is identified in the above-mentioned manner, the electric motor 130 in the abnormal state has almost zero braking torque where $\tau t - \tau p \leq \Delta \tau$, and the torque of the electric motor 130 in the abnormal state can be compensated for by multiplying the torque of the other electric motors 130 by $n/(n-1)$.

Where $\tau t - \tau p > \Delta \tau$, the electric motor 130 in the abnormal state produces braking torque $\tau b$. Thus, for maintaining an operating state of the propeller 110, it is necessary to compensate for torque corresponding to the braking torque.

Figure 15:
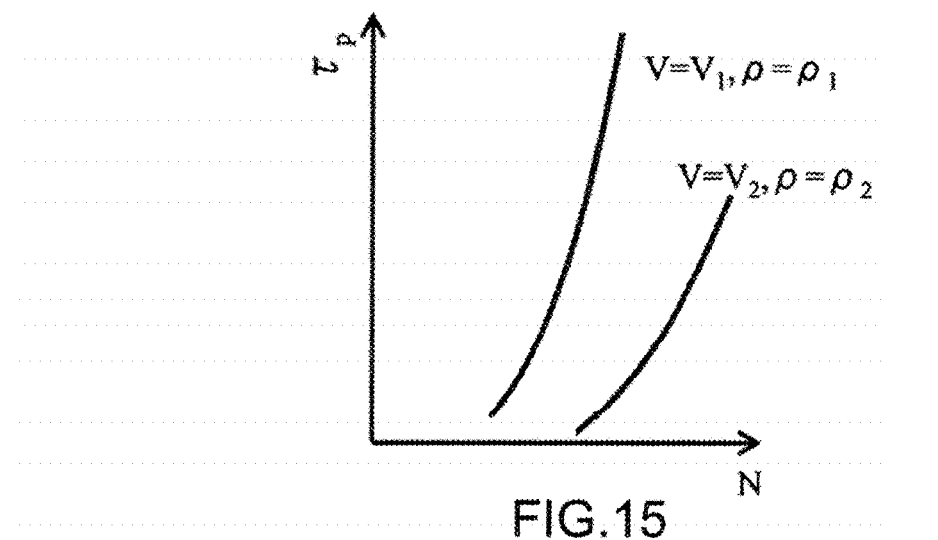
FIG. 15 graph of a relationship between r.p.m. and torque of the control model.

At this time, with the torque command value for the i'th electric motor, which has been determined as being in the abnormal state, being kept at 0 ($\tau mi'=0$), the drive control means 120 estimates propeller torque $\tau p$ at the r.p.m. N on the basis of the relationship among the r.p.m. N, the airspeed V, the air density $\tau$, which are recorded in advance, and the propeller torque $\tau p$ as shown in FIG. 15. Further, the drive control means 120 estimates braking torque $\tau b$ on the basis of a difference between the linear sum of torque of the normal electric motors 130 and the propeller torque $\tau p$.

Figure 16:
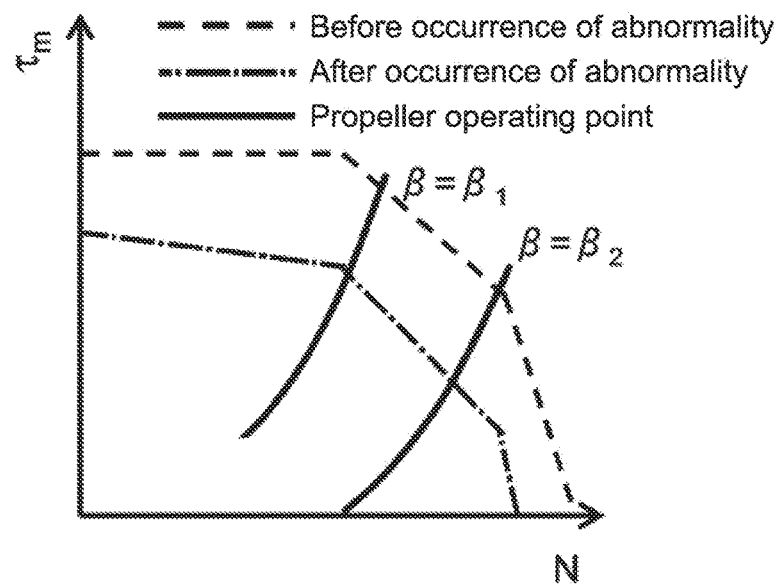
FIG. 16 A graph of a relationship between r.p.m. and torque of the control model before and after occurrence of an abnormality.

By performing the above-mentioned operations while changing the r.p.m. N, it is possible to obtain and model a data group regarding a motor output range after the occurrence of the abnormal state as shown in FIG. 16. Thus, it is possible to arbitrarily control the operating point of the propeller also after the occurrence of the abnormal state.

Figure 17:
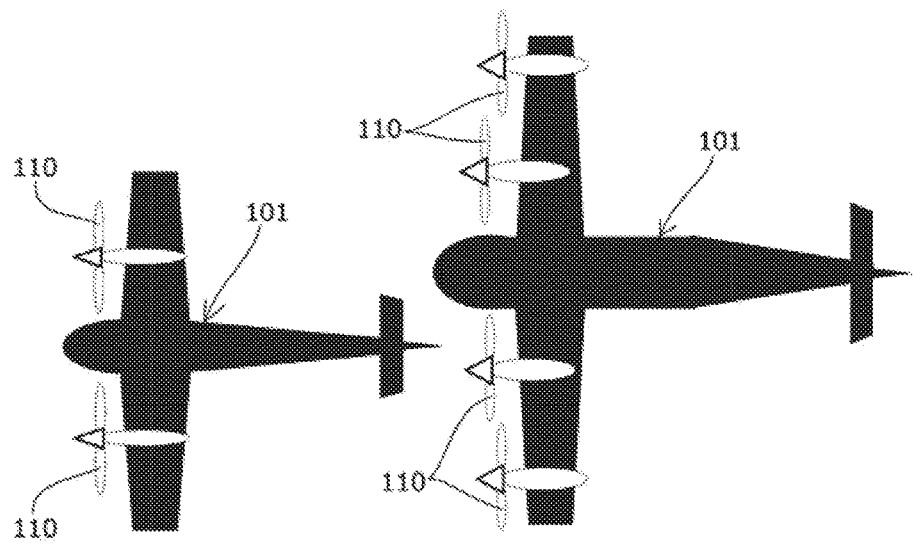
FIG. 17 A schematic diagram of a multi-engine aircraft including a plurality of propulsion systems.
Figure 18:
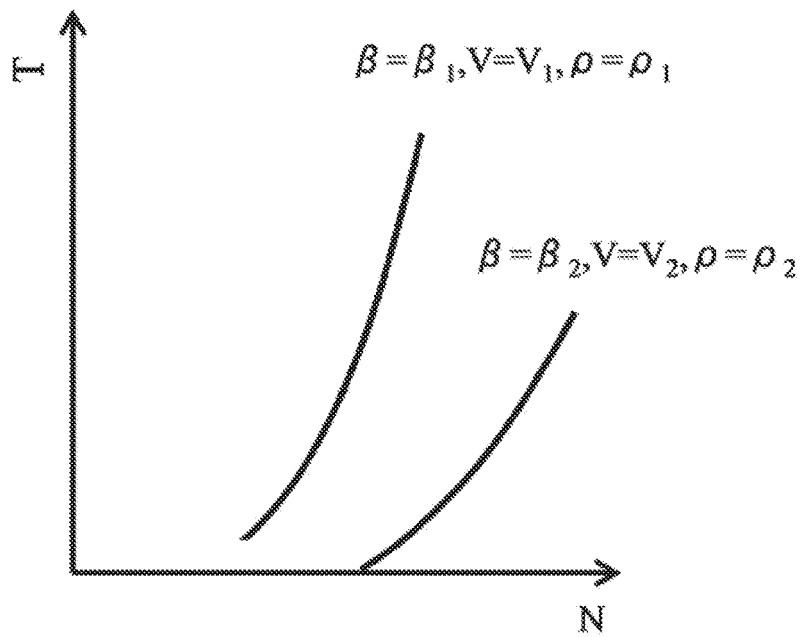
FIG. 18 A graph of a relationship between r.p.m. and thrust of the multi-engine aircraft.

Regarding a multi-engine aircraft including a plurality of propulsion systems as shown in FIG. 17, the stability of the aircraft body is conventionally maintained by reducing output of each of normal propulsion systems correspondingly to an output state of an abnormal propulsion system or adjusting a steering angle of a rudder or the like. However, in the present invention, the drive control means 120 is capable of maintaining thrust T before the occurrence of the abnormal state on the basis of the relationship between the r.p.m. N, the airspeed V, and the air density ρ, which are recorded in advance as shown in FIG. 18 the thrust T, and the output model of the propulsion systems in which abnormal states has occurred, which is reconstructed in the above-mentioned manner.

Further, even if the occurrence of the abnormal state prevents the output range before the occurrence from being maintained as in FIG. 16, it is possible to maintain the thrust T by adjusting the combination of a pitch angle β and the r.p.m. N on the basis of the output characteristic model after the occurrence of the abnormal state to change the operating point of the propeller 110 as described above.

INDUSTRIAL APPLICABILITY

As described above, in accordance with the present invention, the high responsiveness of a propulsion drive system of the motorized aircraft is utilized. Specifically, the output and number of electric motors that rotationally drive the propulsion system propeller are optimally set. With this, it is possible to ensure safety while suppressing an increase in total weight. Further, it is possible to correctly detect an abnormal state and identify an electric motor in the abnormal state and to prevent an increase in workload on a pilot by preventing aircraft body behaviors including a thrust distribution from changing even during the occurrence of the abnormal state. In addition, also with a multi-engine aircraft equipped with a plurality of propellers, it is possible to automatically suppress a change of behaviors of the aircraft body and continue the control, and hence to prevent an increase in workload on a pilot and ensure safety.

Note that any means can be used as the current detection means, the r.p.m. detection means, and the airflow detection means as long as they are means functionally capable of detecting the current, r.p.m., and airflow, and the current detection means, the r.p.m. detection means, and the airflow detection means may be those that detect them by computation based on other parameters.

REFERENCE SIGNS LIST

101 aircraft body
110 propeller (propulsion system propeller)
111 power shaft
120 drive control means
130 electric motor
130g regenerative electric motor
131 one-way clutch
132 power transmission mechanism
133 inverter
134 power supply apparatus
135 power supply-cum-power storage apparatus
136 clutch
137 motor output shaft
140 airflow detection means

The invention claimed is:

1. A motorized aircraft comprising:
a propulsion system propeller or fan;
at least one electric motor that rotationally drives the propulsion system propeller or fan;
a drive control means that controls the electric motor the electric motors;
an r.p.m. detection means that detects r.p.m. of the electric motor;
an airflow detection means that detects atmospheric density and airspeed; and
a current detection means that detects a current of the electric motor, wherein
the drive control means has a characteristic data group regarding a torque characteristic of the propulsion system propeller or fan, which is recorded in advance, and includes a propeller torque estimation unit, a motor torque estimation unit, and a comparison detection unit,
the propeller torque estimation unit estimates propeller torque of the propulsion system propeller or fan on the basis of revolutions per minute (r.p.m.) obtained from the r.p.m. detection means, data of the characteristic data group, and atmospheric density and airspeed obtained from the airflow detection means,
the motor torque estimation unit estimates motor torque on the basis of a current obtained from the current detection means and r.p.m. obtained from the r.p.m. detection means, and
the comparison detection unit compares estimated propeller torque and estimated motor torque with each other and detects an abnormal state of the electric motor on the basis of the fact that a difference between the propeller torque and a multiple of the motor torque is above a predetermined value.

2. The motorized aircraft according to claim 1, wherein the motorized aircraft includes a plurality of the electric motors;
the comparison detection unit identifies an electric motor of the plurality of electric motors, in which the abnormal state occurs, on the basis of the fact that a difference between estimated propeller torque and a linear sum of estimated motor torque is above a predetermined value when the drive control means provides each of the electric motors with a motor torque-changing command.

3. The motorized aircraft according to claim 1, wherein the motorized aircraft includes a plurality of the electric motors;
the comparison detection unit identifies an electric motor of the plurality of electric motors, in which the abnormal state occurs, on the basis of the fact that a difference between estimated propeller torque and a linear sum of estimated motor torque is above a predetermined value when the drive control means provides each of the electric motors with a motor torque-changing command for maintaining r.p.m. of the propulsion system propeller or fan.

4. The motorized aircraft according to claim 1, wherein the motorized aircraft includes a plurality of the electric motors;
the drive control means makes, when causing the electric motors to generate power through rotations of the propulsion system propeller or fan, control such that a rate of motor torque of the plurality of electric motors differs from that during driving.

5. The motorized aircraft according to claim 1, wherein
the motorized aircraft includes a plurality of the electric motors;
at least one of the plurality of electric motors rotationally drives the propulsion system propeller or fan via a one-way clutch.

6. The motorized aircraft according to claim 1, wherein
the motorized aircraft includes a plurality of the electric motors;
the drive control means includes an abnormal-case computation unit, and
the abnormal-case computation unit calculates a torque difference between the estimated propeller torque and a linear sum of motor torque of the electric motors excluding the electric motor in which the abnormal state occurs, and estimates, on the basis of the calculated torque difference, torque of the electric motor in which the abnormal state occurs.

7. The motorized aircraft according to claim 1, wherein
the drive control means causes the comparison detection unit to operate at a plurality of different r.p.m. of the propulsion system propeller or fan to calculate an abnormality-case data group regarding a relationship between motor torque of an electric motor in which an abnormal state occurs and r.p.m. of the propulsion system propeller or fan.

8. The motorized aircraft according to claim 7, wherein
the drive control means makes control such that thrust or propeller torque before occurrence of an abnormal state is maintained within a predetermined range, on the basis of the characteristic data group and the abnormality-case data group.

9. The motorized aircraft according to claim 1, further comprising
a plurality of propellers or fans, wherein
the drive control means makes control such that a difference between a value of a moment acting on the aircraft body after occurrence of an abnormal state of the electric motor and a value of a moment acting on the aircraft body before the occurrence is maintained within a predetermined range.

10. A method for detecting an abnormal state of an electric motor that rotationally drives a propulsion system propeller or fan of a motorized aircraft, the method comprising the steps of:
recording a characteristic data group regarding a torque characteristic of the propulsion system propeller or fan in advance;
detecting revolutions per minute (r.p.m.) of the electric motor using a r.p.m detection means;
detecting a current of the electric motor using a current detection means;
detecting atmospheric density and airspeed using an airflow detection means
estimating propeller torque of the propulsion system propeller or fan on the basis of the detected r.p.m., data of the characteristic data group, and the detected atmospheric density and airspeed;
estimating motor torque on the basis of the detected current and the detected r.p.m.; and
comparing the estimated propeller torque and the estimated motor torque with each other, and detecting the abnormal state of the electric motor on the basis of the fact that a difference between the estimated propeller torque and a multiple of the estimated motor torque is above a predetermined value.

* * * * *